United States Patent
Tsuda

[11] 3,763,762
[45] Oct. 9, 1973

[54] VENTILATING SYSTEM FOR THE PASSENGER COMPARTMENT OF MOTOR VEHICLE

[75] Inventor: Yasuhisa Tsuda, Tokyo, Japan

[73] Assignee: Nissan Motor Company, Limited, Yokohama City, Japan

[22] Filed: Jan. 20, 1972

[21] Appl. No.: 219,412

[30] Foreign Application Priority Data
Jan. 28, 1971 Japan.................................. 46/3546

[52] U.S. Cl. ................................................ 98/2.18
[51] Int. Cl............................................. B60h 1/24
[58] Field of Search..................... 98/2.16, 2.17, 2.18

[56] References Cited
UNITED STATES PATENTS
3,357,338  12/1967  Pollock.............................. 98/2.18

Primary Examiner—Meyer Perlin
Assistant Examiner—Ronald C. Capossela
Attorney—John Lezdey

[57] ABSTRACT

A ventilating system for a motor vehicle including a vehicle body having a passenger compartment and rear pillar structures for supporting the roof structure of the vehicle, which ventilating system consists of an air inlet in communication with the passenger compartment, at least one of the pillar structures having spaced inner panel and outer panel members forming a chamber therein, an inwardly facing U-shaped member located in the chamber and having a flange portion integrally formed with the inner panel member of the pillar structure, the inwardly facing U-shaped member having a bottom wall provided with an opening in communication with the air inlet, and outwardly facing U-shaped member located in the chamber and associated with the inwardly facing U-shaped member for interrupting communication between a trunk room or side sill structure of the vehicle and the passenger compartment, the outwardly facing U-shaped member having a bottom wall provided with an opening and having a flange portion attached to the outer panel member of the pillar structure, the opening of the bottom wall of the outwardly facing U-shaped member being aligned with the opening of the bottom wall of the inwardly facing U-shaped member, the bottom walls of the inwardly facing and outwardly facing U-shaped members being connected with each other, and an air outlet formed in the outer panel member of the pillar structure and in communication with the air inlet through the openings.

4 Claims, 7 Drawing Figures

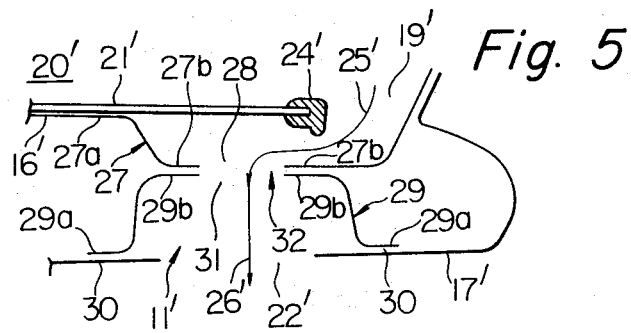
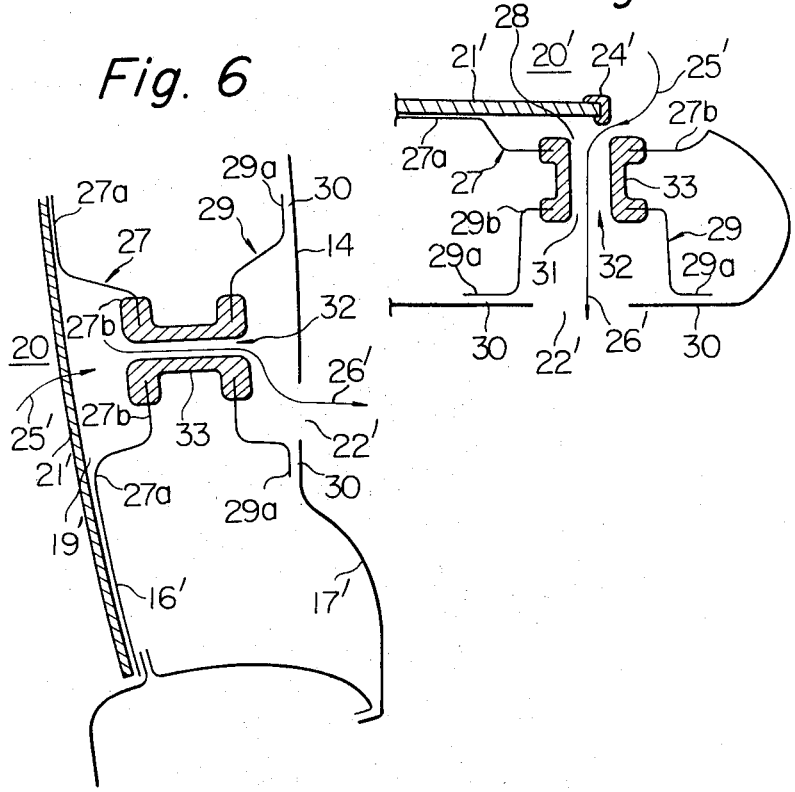

3,763,762

VENTILATING SYSTEM FOR THE PASSENGER COMPARTMENT OF MOTOR VEHICLE

This invention relates in general to ventilating systems and more particularly to a ventilating system for the passenger compartment of a motor vehicle.

A conventional ventilating system of a motor vehicle is usually constructed as to communicate with, in addition to the passenger compartment, a trunk room and/or side sill structure forming part of a vehicle body, as will be hereinafter discussed in detail. With this construction, there frequently takes place a back flow of a foul air from the trunk room and/or side sill structure into the passenger compartment so that it is extremely difficult to assure a sufficient ventilation effect of the passenger compartment. Moreover, the communication between the passenger compartment and the trunk room of the motor vehicle is reflected by an increase in undesirable noises to be transmitted to the passenger compartment.

It is, therefore, an object of the present invention to provide an improved ventilating system for the passenger compartment of a motor vehicle, which system is adapted to achieve a sufficient ventilation of the passenger compartment.

Another object of the present invention is to provide an improved ventilating system for the passenger compartment of the motor vehicle, which system is highly effective in reducing undesirable noises to be transmitted to the passenger compartment from the trunk room and/or side sill structure of the motor vehicle.

A still other object of the present invention is to provide an improved ventilating system for the passenger compartment of the motor vehicle, which system is adapted to prevent a back flow of a foul air from the trunk room and/or side sill structure of the motor vehicle into the passenger compartment.

A further object of the present invention is to provide an improved ventilating system for the passenger compartment of the motor vehicle, which system is simplified in construction and economical to manufacture.

In order to achieve these objects, the present invention contemplates to provide a ventilating system which is constructed and arranged to connect the interior of the passenger compartment of a vehicle with the atmosphere through a ventilation air flow passage provided in each of rear pillar members of a vehicle body. To this end, an air inlet opening is provided which is in communication with the passenger compartment. The rear pillar member consists of an inner panel member and an outer panel member, which form a chamber therebetween. An inwardly facing U-shaped member is located in the chamber formed with the inner and outer panel members of the rear pillar. This U-shaped member has a flange portion integrally formed with the inner panel member of the rear pillar and a bottom wall provided with an opening, which is in communication with the air inlet. An outwardly facing U-shaped member is positioned in the chamber formed in the rear pillar in opposite relationship with respect to the inwardly facing U-shaped member. The outwardly facing U-shaped member is provided with a bottom wall having an opening, which is aligned with the opening of the bottom of the inwardly facing U-shaped member to form the ventilation air flow passage. The outwardly facing U-shaped member is further provided with a flange portion, which is attached to the outer panel member of the rear pillar by means of adhesive having a sealing function. In one preferred embodiment of the present invention, the bottom walls of the U-shaped members are connected with each other by means of the adhesive having the sealing function. In a modified form of the present invention, these bottom walls are connected to each other through a ventilation duct providing communication between the air inlet and the air outlet. This construction is advantageous in that the communication between the side sill structure and/or the trunk room and the passenger compartment is interrupted to prevent the back flow of the foul air into the passenger compartment from the side sill structure and/or the trunk room for thereby providing an adequate ventilation of the passenger compartment. This construction is, moreover, advantageous in that the road noises can be significantly decreased and thus the interior of the passenger compartment can be maintained comfortable for the vehicle occupant.

These and other objects, features and advantages of the present invention will become more apparent from the following description when taken in conjunction with the accompanying drawings, in which:

FIG. 5 is a view similar to FIG. 3 but shows the pillar member of the vehicle body having the ventilating system according to the present invention;

FIG. 6 is a view similar to FIG. 2 but shows the pillar member of the vehicle body having a modified form of the ventilating system of FIGS. 4 and 5; and FIG. 7 is a view similar to FIG. 3 but shows the pillar member of the vehicle body having the modified form of the ventilating system of FIGS. 4 and 5.

Figure 1:
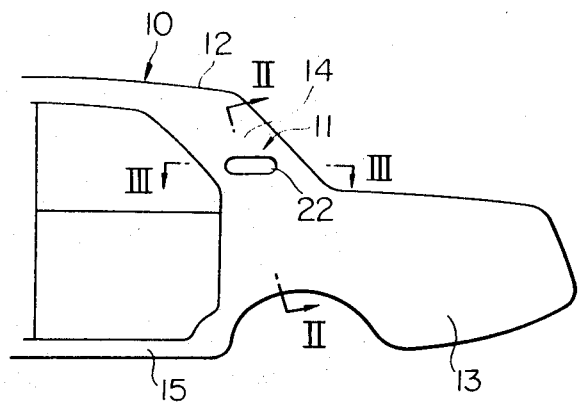
FIG. 1 is a fragmentary side elevational view of a rear portion of a vehicle body having a conventional ventilating system incorporated therein.
Figure 2:
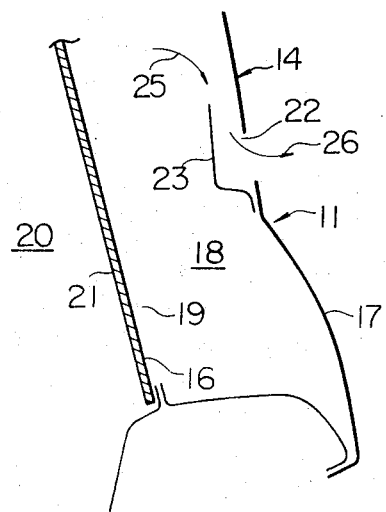
FIG. 2 is a fragmentary sectional view of the pillar member of the vehicle body taken on the line II—II of FIG. 1.
Figure 3:
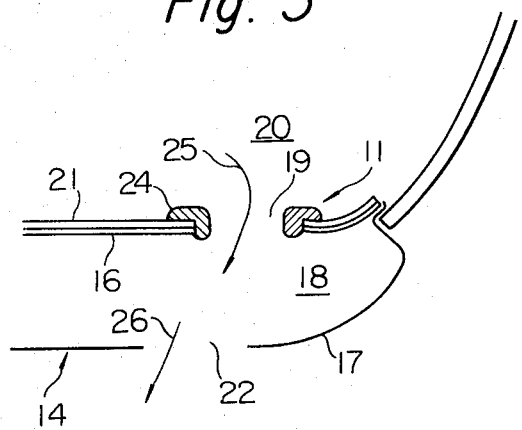
FIG. 3 is a fragmentary sectional view of the pillar member of the vehicle body taken on the line III—III of FIG. 1.

Referring now to the drawings and more particularly to FIGS. 1 through 3, there is shown a rear portion of a vehicle body 10 employing a conventional ventilating system 11. The vehicle body, generally designated at 10, has a roof structure 12 supported on a lower rear body structure 13 by hollow pillar structures 14, only one of which can be seen in FIG. 1. As in a conventional vehicle body design, the lower rear body structure 13 has therein a trunk room for placing the luggages therein, though not shown. The lower rear body structure 13 is integrally connected to side sill structures 15 (only one of which is shown in FIG. 1) to from a framework for the vehicle body to provide a rigidity.

As best seen from FIGS. 2 and 3, the conventional ventilating system 11 is constructed mainly by each of the hollow rear pillar structures 14. As shown in FIG. 2, each pillar structure 14 may consist of an inner body panel member 16 and an exterior or outer body panel member 17, which form a chamber 18 therebetween. The inner body panel member 16 is provided with a ventilation air inlet opening 19 which is in communication with the interior 20 of the passenger compartment through a trim wall 21. A ventilation air outlet opening 22 is provided in the outer body panel member 17 of the pillar structure 14 and in communication with the chamber 18.

A buffle plate 23 is arranged in the chamber or interior 18 of the pillar structure 14 at a position below the ventilating air outlet opening 22. The buffle plate 23 prevents any water from entering the passenger compartment 20 through the chamber 18. Indicated at 24 is a drafter grill, which is provided at the ventilating air inlet opening 19 formed in the inner body panel member 16. The air from the passenger compartment 20 enters through the trim wall 21 into the chamber 18 of the pillar structure 14, through which the air discharges out from the ventilating air outlet opening 22 by following the flow path generally indicated by the arrows 25 and 26.

In the conventional ventilating system 11 described above, the chamber or interior 18 of the pillar structure 14 is arranged to be in communication with the interiors of the side sill structure 15 and the trunk room and accordingly the foul air therein is caused to enter the interior 20 of the passenger compartment so that the sufficient ventilation of the passenger compartment can not be obtained. With this arrangement, moreover, undesirable external noises or road noises are transmitted to the passenger compartment from the trunk room (not shown) and dusts or foreign materials are caused to enter from the side sill structure 15 into the framework of the vehicle body due to its inherent construction to cause clogging of the framework of the vehicle body.

The present invention is intended to obviate the aforementioned inadequacies and shortcomings encountered in the conventional ventilating system and to eliminate the external noises and the entry of the foreign materials into the passenger compartment.

Figure 4:
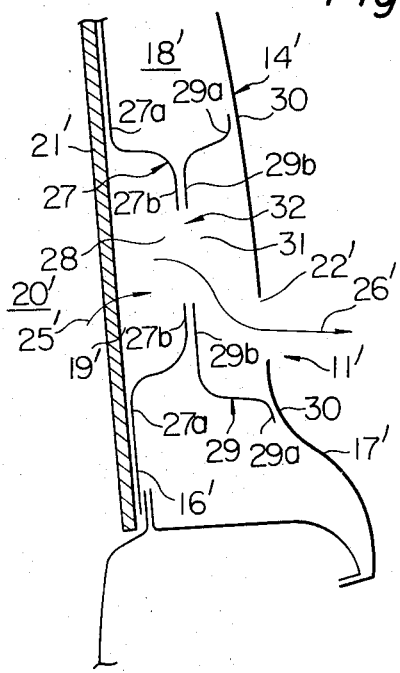
FIG. 4 is a view similar to FIG. 2 but shows the pillar member of the vehicle body having a ventilating system according to the present invention.

A preferred embodiment of the ventilating system implementing the present invention is illustrated in FIGS. 4 and 5, wherein like component parts are designated by same numerals as used in FIGS. 1 through 3 with the exception that a prime (') has been added thereto.

According to the present invention, the ventilating system 11' includes, in addition to the ventilation air inlet opening 19', a U-shaped member 27 which is inwardly facing with respect to the interior of the passenger compartment, and which is located in the chamber 18' of the pillar structure 14'. The inwardly facing U-shaped member 27 has a flange portion 27a which is integrally formed with the inner body panel member 16' as shown in FIGS. 4 and 5. The U-shaped member 27 also has a bottom wall 27b which is provided with an opening 28. The opening 28 is in communication with the ventilation air inlet opening 19'. An outwardly facing U-shaped member 29 is also located in the chamber 18' of the pillar structure 14' in opposite relationship with respect to the inwardly facing U-shaped member 27.

The outwardly facing U-shaped member 29 is provided with a flange portion 29a, which is attached to the inner surface of the outer body panel member 17' of the pillar structure 14' by means of an adhesive 30 having a sealing function. The U-shaped member 29 is also provided with a bottom wall 29b, which is provided with an opening 31. The opening 31 of the outwardly facing U-shaped member 29 is aligned with the opening 28 of the inwardly facing U-shaped member 27 to form a ventilation air flow passage 32 therethrough, which is in communication with the ventilation air outlet opening 26' formed in the outer body panel member 17' of the pillar structure 14'. In the illustrated embodiment of FIGS. 4 and 5, the bottom walls 27b and 29b of the U-shaped members 27 and 29 are connected with each other by means of an adhesive having a sealing function but may be connected with each other by other suitable connecting means as will be discussed hereinafter.

With this construction, the passenger compartment 20' are prevented from communicating with the trunk room (not shown) or side sill structure with the result that the foul air or foreign materials therein is prevented from entering the passenger compartment 20'. Thus, the adequate ventilation of the passenger compartment is obtained. Moreover, since the communication between the passenger compartment, and the trunk room side sill structure, no external noises can be transmitted to the passenger compartment.

A modified form of the ventilating system 11' of the present invention is illustrated in FIGS. 6 and 7, wherein like reference numerals are used to designate like or corresponding component parts. In this modification, the bottom walls 27b and 29b are connected with each other by means of a ventilation duct 33 made of suitable material such as rubber, in which the ventilation air flow passage 32 is defined. The other construction and arrangement of the ventilating system 11' is the same as that of system 11' shown in FIGS. 4 and 5 and, therefore, the detailed description of the same is herein omitted for the sake of simplicity of illustration.

It will now be appreciated from the foregoing description that the ventilating system of the present invention is advantageous to avoid entry of foreign materials or foul air in the trunk room and the side sill structure into the passenger compartment of the motor vehicle for thereby increasing ventilation effect of the passenger compartment.

It will also be understood that since the passenger compartment is interrupted from communication with the trunk room and the side sill structure, external noises is prevented from transmitting to the passenger compartment.

It will further be noted that the ventilating system of the present invention is compact and simple in construction by the use of minimum number of component parts thereby to reduce production cost.

What is claimed is

1. A ventilating system for a motor vehicle including a vehicle body having a passenger compartment, a roof structure, pillers supporting said roof structure at the rear thereof, a rear outer panel integrally connected to said roof structure and defining therein a trunk room, and a side sill structure integrally connected to said outer panel, said ventilating system comprising an air inlet in communication with said passenger compartment, at least one of said pillers having spaced inner panel and outer panel members forming a chamber therein, an inwardly facing U-shaped member located in said chamber and having a flange portion formed with said inner panel member of said piller, said inwardly facing U-shaped member having a bottom wall provided with an opening in communication with said air inlet, an outwardly facing U-shaped member located in said chamber, said outwardly facing U-shaped member having a bottom wall provided with an opening and having a flange portion attached to said outer panel member of said piller, said opening of the bottom wall of said outwardly facing U-shaped member being aligned with said opening of said inwardly facing U-shaped member, the bottom walls of said inwardly facing and outwardly facing U-shaped members being connected with each other, and an air outlet formed in said outer panel member of said piller and in communication with said air inlet through said openings.

2. A ventilating system according to claim 1, wherein said bottom walls of said U-shaped members are connected with each other by an adhesive having a sealing function.

3. A ventilating system according to claim 1, wherein said bottom walls of said U-shaped members are connected with each other through a ventilation duct which provides communication between said air inlet and said air outlet.

4. A ventilating system according to claim 1, wherein said flange portion of said outwardly facing U-shaped member is attached to an inner surface of said outer panel member of said pillar by means of an adhesive having a sealing function.

* * * * *